United States Patent Office.

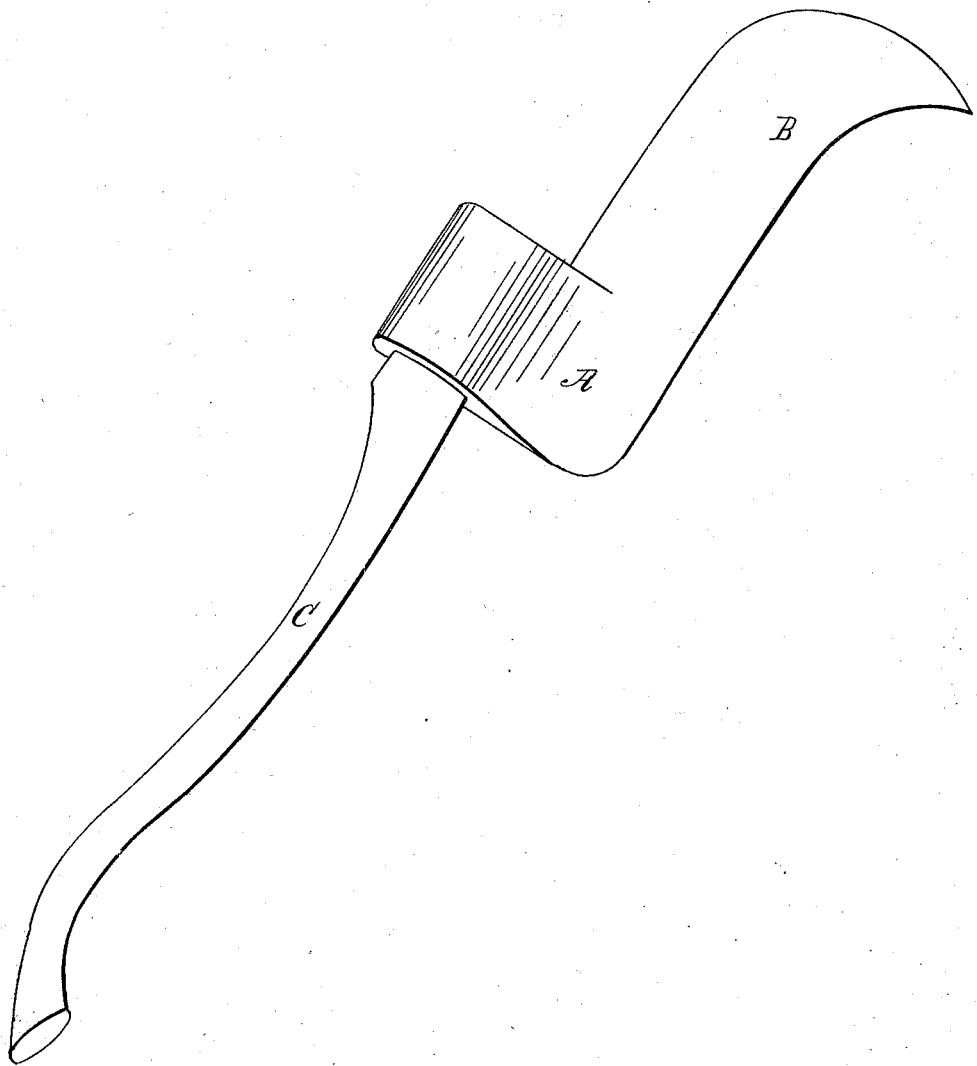

PHILETUS W. NORRIS, OF DETROIT, MICHIGAN.

Letters Patent No. 99,784, dated February 15, 1870.

IMPROVEMENT IN GRUBBING-AX AND HOOK COMBINED.

The Schedule referred to in these Letters Patent and making part of the same

To whom it may concern:

Know all men that I, PHILETUS W. NORRIS, of Detroit, in the county of Wayne, and State of Michigan, have invented a new and useful Improvement in an Ax and Grubber Combined; and I do declare that the following is a true and accurate description thereof, reference being had to the accompanying drawings and to the letters of reference marked thereon, and being a part of this specification.

Most of the tools usually sold as grub-hooks or bush-hooks are so constructed that the operator is compelled to throw the point of the hook behind the grub to be cut, and then by a pulling jerk cut it off. The eye or socket for the insertion of the handle is always circular in form, compelling the use of a round handle, which, as the implement has its greatest weight near the point and on one side of the center, allows it and gives it a constant tendency to turn in the hand of the operator. In clearing land with them the operator is obliged to use two distinct and separate tools, viz: an ax for chopping when necessary, and a grubber for its legitimate use.

The object of this invention is to obviate the necessity of carrying and using two different implements, by combining the two into one tool, and arranging the eye so that an ordinary ax-handle may be used, whereby the movements of the implement can be accurately governed, and all tendency to turn in the hand is avoided. By combining the two, (using a longer or shorter bit to the ax, according to the work to be done,) I make an implement by which the weight of the tool and the velocity of the blow will enable the operator to cut off the root or grub, instead of being compelled to cut it off by brute force, as is the case in bush-hooks of the ordinary construction, while the ax-bit enables him to cut small trees with as much ease as he could with an ax separate.

In the annexed drawings—

A represents the ax part of my device, made in the usual form of an American chopping-ax, except that the poll is rather heavier than in such axes, for the purpose of counterbalancing the weight of the hook hereinafter described. This ax is provided with an elliptical eye passing entirely through it, the longest direction of which is in the vertical line of the ax, and the smallest end of which is downward.

B represents the hook, extending beyond and being a continuation of the ax between the bottom of the eye and the bit, the edge of which hook is a continuation of the line of the bit, being substantially straight to the ax proper, and continuing beyond said ax proper in a straight line a distance about as great as the length of the bit of the ax proper, when it curves downward about a couple of inches, and terminates in a sharp point. The back of this hook corresponds to the edge of it, except that it has a greater turn at the end, so that the hook may be strong at its point.

To this device a usual ax-handle, C, is secured in any ordinary manner.

The drawing shows the hook longer than I usually make it in the manufacture of this implement.

The great merit of my device consists in its effectiveness. It enables the operator by reason of percussive blows to sever roots as well as could be done with ordinary axes, and yet permits him to use the hook also, by drawing toward him in cutting small roots and twigs, and by using it as a lever, with the edge upward, and the poll of the ax serving as a fulcrum.

Having thus fully set out the nature and merits of my device,

What I claim as my invention, and desire to secure by Letters Patent, is—

The combined ax and grubber A B, constructed as shown and described, provided with an elliptical eye, into which an ordinary ax-handle is secured, and operating as and for the purposes set forth.

PHILETUS W. NORRIS.

Witnesses:
H. S. SPRAGUE,
H. G. HANNAMAN.